Figure 14:
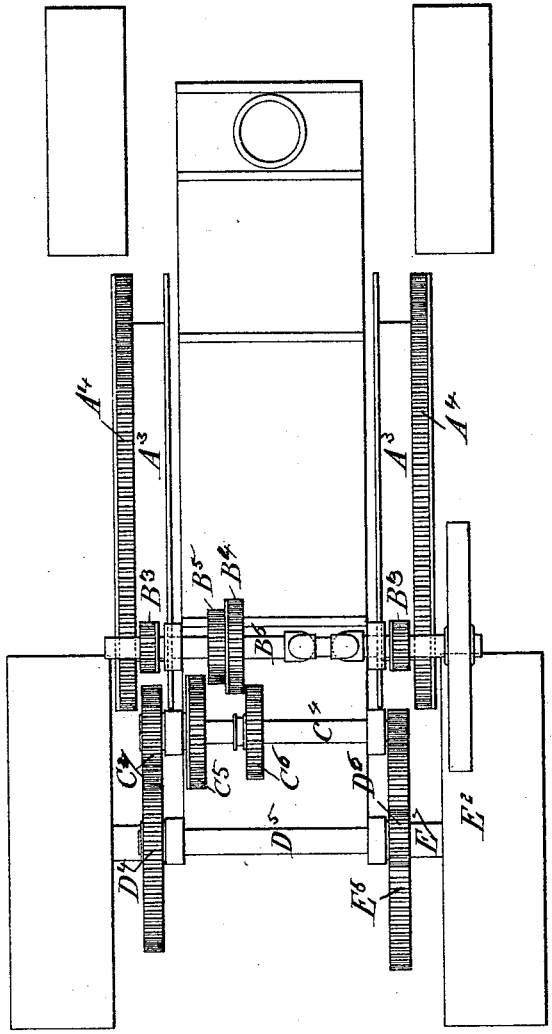

(No Model.) 5 Sheets—Sheet 1.
P. EVERITT & T. COOPER.
STEAM TILLING MACHINE.
No. 389,141. Patented Sept. 4, 1888.
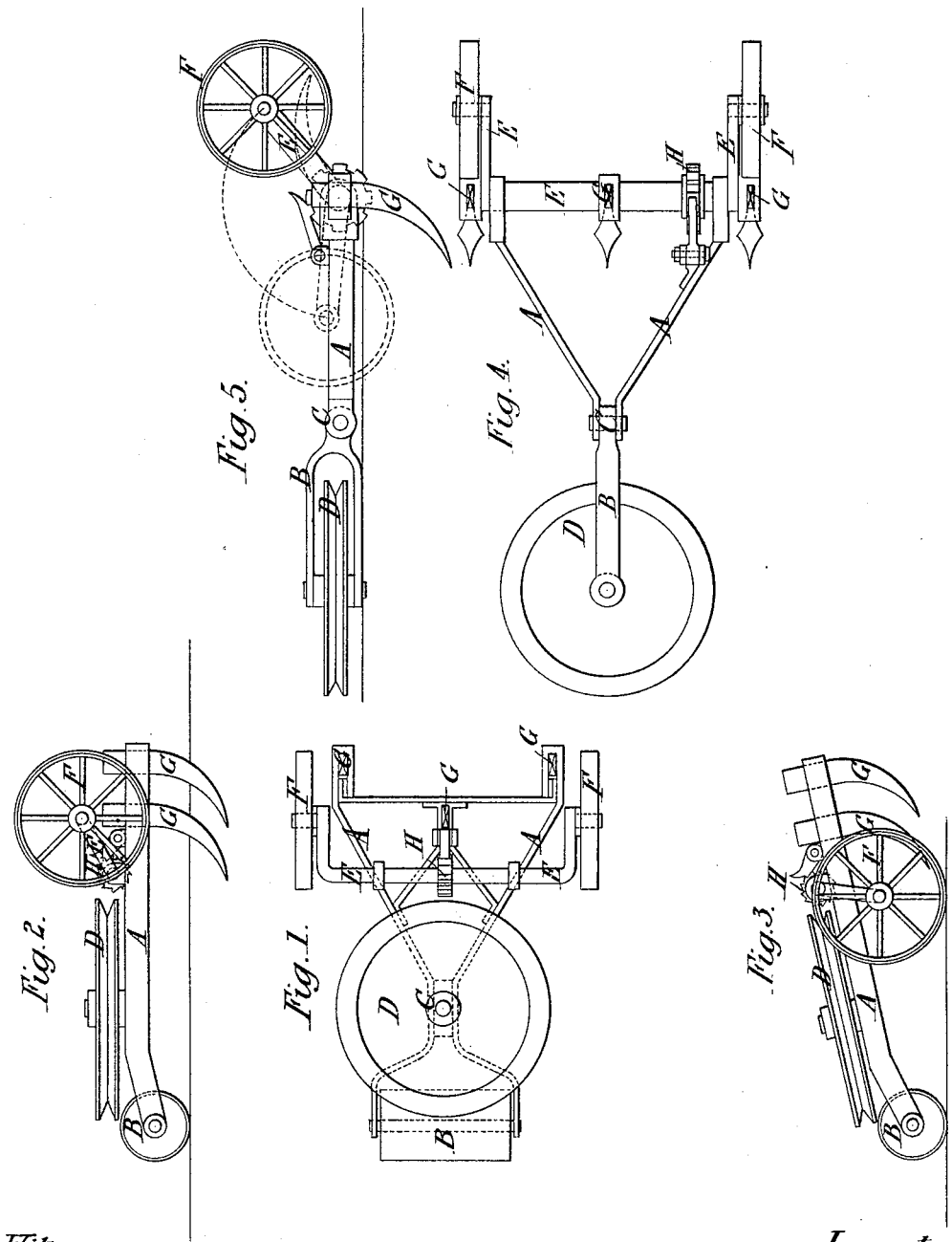
Witnesses,
Will T. Norton
Alvin Belt.
Inventors,
Percival Everitt
and Thos. Cooper.
by John J. Halsted & Son.
their Attys.

(No Model.)  5 Sheets—Sheet 2.
P. EVERITT & T. COOPER.
STEAM TILLING MACHINE.
No. 389,141.  Patented Sept. 4, 1888.
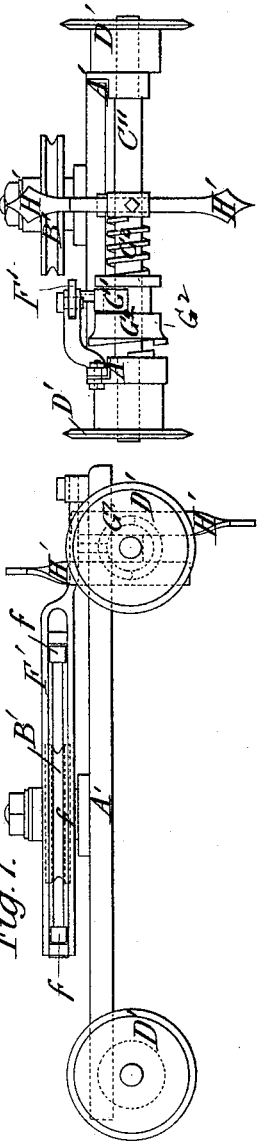
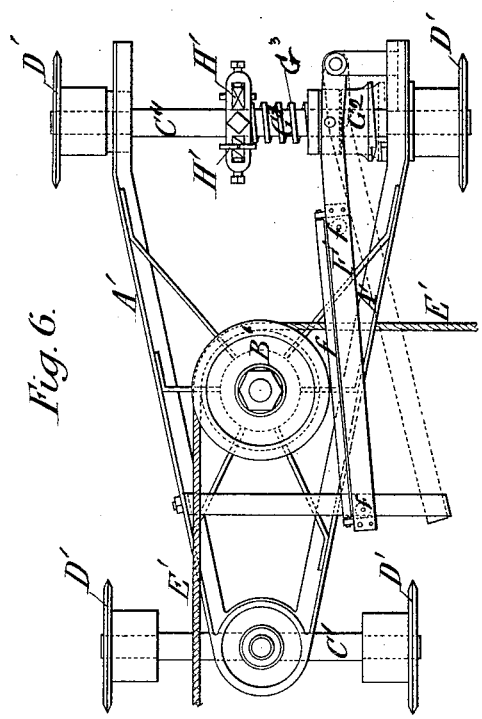
Witnesses.
Inventors,
Percival Everitt
and Thos. Cooper,
by John J. Halsted & Son,
their Att'ys.

(No Model.) 5 Sheets—Sheet 3.
P. EVERITT & T. COOPER.
STEAM TILLING MACHINE.
No. 389,141. Patented Sept. 4, 1888.
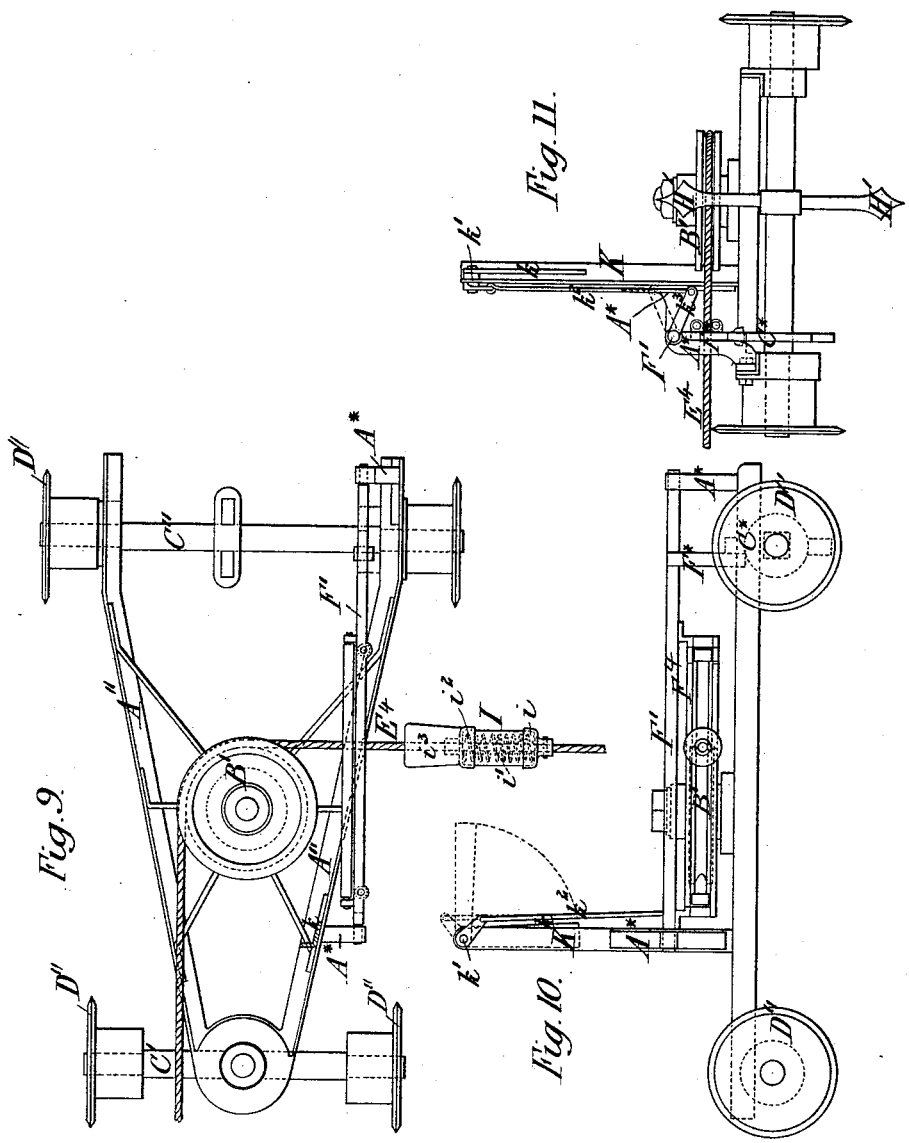

(No Model.) 5 Sheets—Sheet 4.
P. EVERITT & T. COOPER.
STEAM TILLING MACHINE.
No. 389,141. Patented Sept. 4, 1888.
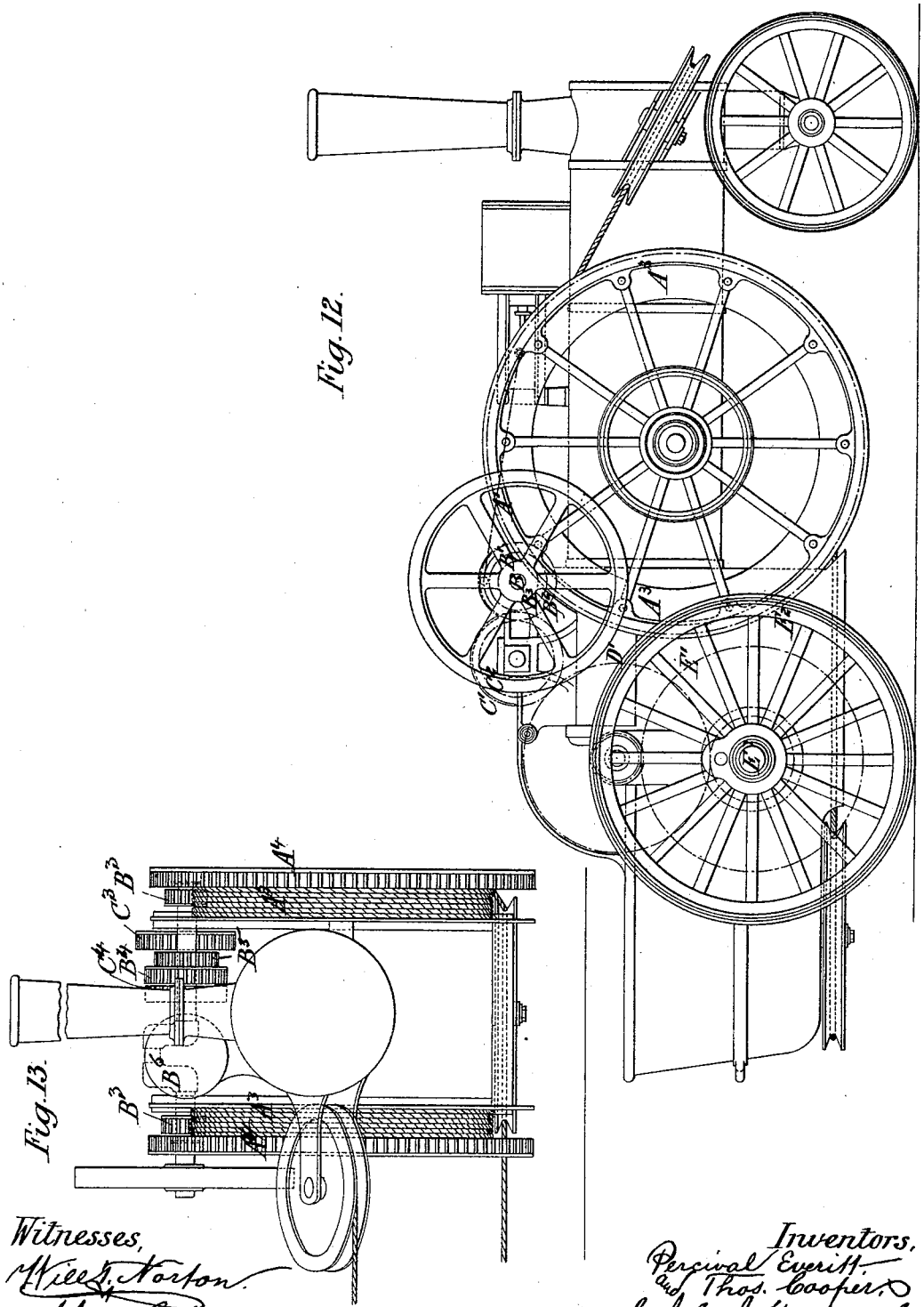

(No Model.) 5 Sheets—Sheet 5.

P. EVERITT & T. COOPER.
STEAM TILLING MACHINE.

No. 389,141. Patented Sept. 4, 1888.

Witnesses. Inventors.

UNITED STATES PATENT OFFICE.

PERCIVAL EVERITT, OF LONDON, AND THOMAS COOPER, OF GREAT RYBURGH, ENGLAND; SAID COOPER ASSIGNOR TO SAID EVERITT.

STEAM TILLING-MACHINE.

SPECIFICATION forming part of Letters Patent No. 389,141, dated September 4, 1888.

Application filed December 21, 1887. Serial No. 258,595. (No model.) Patented in England September 7, 1878, No. 3,553.

*To all whom it may concern:*

Be it known that we, PERCIVAL EVERITT and THOMAS COOPER, subjects of the Queen of Great Britain, residing at London, England, and Great Ryburgh, England, respectively, have invented new and useful Improvements in Machinery for Tilling Land by Steam-Power, (the same having been patented in Great Britain September 7, 1878, No. 3,553,) of which the following is a specification.

This invention relates, first, to an improved construction of snatch-block which is capable of being traversed along the road to its work.

In Sheet I of the accompanying drawings, Figure 1 shows the snatch-block in plan view. Fig. 2 is a side elevation of the snatch-block in its holding position, and Fig. 3 is a side elevation showing the snatch-block in a position for traveling.

It consists of a frame, A, made of bar-iron, bent at its rear end into the form of a triangle and continued forward to form a forked bearing for a roller, B. Between the fork and the triangle the frame is fitted with a stud-pin, C, for receiving a guide-pulley, D, around which the hauling-rope from the engine is passed. Mounted on the triangular portion of the frame is a transverse cranked axle, E, to which is fitted a pair of traveling wheels, F. At the rear of the frame or base of the triangle claws or tines G G G are fitted for entering the earth and taking a firm hold of the ground. The traveling wheels when in use hold these tines out of action, as shown in Fig. 3, their cranked shaft being locked to secure them in the working position by a pawl on the framing A taking into a ratchet-wheel, H, keyed on the crank-shaft. When, however, the crank-shaft is unlocked, the tension put on the hauling-rope will draw the tines into the ground. The attendant can then lift the wheels out of the way and secure them in the position shown at Fig. 2. The roller B in front of the snatch-block frame serves to prevent the front part of the frame of the snatch-block from dipping into the ground, and thus converting the frame into a lever for lifting out the tines. When it is required to shift the snatch-block, the traveling wheels are turned over from the back position to the front, and the drag of the hauling-rope will then cause the wheels, through their cranked shaft, to lift the tines clear of the ground. The cranked axle may then be locked in the position shown at Fig. 3, when it will be ready for removal to a new position. The roller B and wheels F F then serve as carrying-wheels. As a modification of this arrangement, we substitute for the roller B and its forked bearing a hinged frame, which carries the guide-pulley D, and we fit the tines to the cranked shaft instead of to the framing. The tines will thus be raised and lowered by the direct action of the cranked shaft. This modification is shown in plan view at Fig. 4 and in side elevation at Fig. 5, which represent the pulley-frame B connected to the framing A by a hinged joint, c, which will allow of the pulley D adjusting itself to any desired angle. The cranked axle E is fitted with sockets for the reception of the tines G G G. When the tines are in the ground, the traveling wheels F F will be in the raised position of Fig. 5. In order to withdraw the tines, it is only necessary to turn the wheels over to the dotted position at Fig. 5, and on locking the cranked axle by the pawl and toothed wheel provided for the purpose the snatch-block will be ready for traveling.

The invention relates, secondly, to traveling anchors for shifting the cultivator at the end of each "bout," and bringing it into position for recommencing the work. In our improved anchors we cause the draft-rope, when it has brought the cultivator to the end of its bout, to act as a draft-rope on the anchor and move the anchor along the headland. The means for effecting this object we will now proceed to describe, reference being had to Sheet II of the drawings, where Fig. 6 is a plan view of our improved anchor; Fig. 7, a side elevation of the same, and Fig. 8 an elevation of the back end of the traveling anchor.

A' A' is the frame of the anchor, composed for the most part of angle-iron, with radius-arms for carrying the stud-pin of the anchor-pulley B'. The frame is fitted at its opposite ends with transverse axles C' C'', for receiving traveling wheels, which, when the anchor is prepared for work, are removed and replaced by disk-wheels D' D', which enter the ground and form a resistance to the lateral pull of the draft-rope. This rope (shown at E') runs through a slotted horizontal lever, F', pivoted to the rear end of the frame A'. To prevent friction of the rope, this lever is fitted with horizontal and vertical anti-friction rollers $ff$ around its longitudinal slot. Attached to the rear end of the lever F' is a fork, G', which embraces the sliding clutch $G^2$ on the hinder axle, C''. This clutch slides on a square portion of this axle, and under the action of a coiled spring, $G^3$, locks onto a fixed clutch carried by the framing A'. By this means all tendency of the axle to rotate is destroyed. Fitted to the axle C'' are sockets to carry tines H' H', which are intended to enter the ground and resist the direct pull of the hauling-rope until the tilling implement has reached the end of its bout, at which time the anchor will be required to move forward and take up a new position. The draft-rope we provide with an elastic stop, (hereinafter described,) which, when a bout is completed, strikes the lever F', causing it to withdraw the clutch $G^2$ and unlock the axle C''. The anchor will then be free to respond to the forward drag of the draft-rope, the disk-wheels moving forward in the ground and the tines revolving with the axle until one or other set takes up a position in the ground at the moment that the engine is reversed to work the cultivator in the opposite direction. This reversing of the engine will release the lever F from the pull of the draft-rope and allow the spring $G^3$ to come into action and lock the axle C''. The tilling operation will then proceed as before.

Figs. 9, 10, and 11, Sheet III, show in plan and in side and end elevation a modified form of this anchor, in which the draft-rope is caused to unlock the hind axle, C'', by the rocking of a swinging frame through which the rope passes. In these figures, $F^4$ is the swinging frame, fitted with anti-friction rollers $f$ for the draft-rope to run over. The fulcrum-rod F' of this frame is carried by brackets $A^*$ of the framing A'', and pendent from this fulcrum-rod is a short stop-lever, $F^*$, which, by coming into contact with pins or projections on a disk, $C^*$, keyed to the axle C', will lock that axle and prevent its rotating under the drag of the hauling-rope. The axle C'' is fitted, as before described, with tines for taking hold of the ground and presenting a firm resistance to the advance of the anchor. When, however, at the conclusion of a bout, the elastic stop of the draft-rope strikes the swinging frame $F^4$ of the anchor, it will rock the stop-lever $F^*$ out of action and leave the axle C', with its disk-wheels, free to rotate under the forward drag of the rope, the action being precisely the same as that explained with reference to Figs. 6, 7, and 8.

Referring now to I, Fig. 9, it will be seen how the elastic stop before mentioned is made. Firmly attached to the draft-rope $E^4$ is a metal cup, $i$, for receiving a coiled-spring, $i^2$, incased in leather or some water-proof material. Above this is placed a second cup, $i^2$, which is made with a socket like the cup $i$, but in this instance the cup is loose upon the rope. Fitting tightly the socket of the cup $i^2$ is a block, $i^3$, which is free to slide on the rope. Whenever, therefore, the stop I is brought up into contact with the anchor, instead of delivering a hard and perhaps injurious blow to the guide through which the rope passes, it will deliver an elastic and harmless blow, tempered by the yielding of the coiled spring $i'$.

As a guide to the engine-driver, we fit the anchor with a semaphore or other signal, which is brought into view by the action of the stop I on the hauling-rope $E^4$. This is illustrated at Figs. 9, 10, and 11, where K is a semaphore-post standing up from the framing A'' and carrying at its upper end a semaphore-arm, $k$. The spindle $k'$, on which this arm is keyed, is fitted with a crank-arm, which is connected by a pendent link-rod, $k^2$, to a short arm, $k^3$, of the fulcrum-rod F'. When, therefore, the swinging frame $F^4$ is rocked inward by the hauling-rope and the axle C'' is unlocked, a movement outward will be given to the semaphore-arm. Thus, when this signal appears in sight, the engine-driver will know that the cultivator has completed a bout, and he will continue the action on the hauling-rope to move forward the anchor until a signal from the man on the cultivator warns him to stop the progress of the anchor and reverse the engine. The effect of this reversal will be to release the swinging frame from pressure and to cause the semaphore-arm to drop. This arrangement of semaphore or signaling apparatus, it will be understood, may be readily adapted to all anchors which derive their traverse motion from the hauling-rope.

The invention relates, lastly, to a rearrangement of the winding-drums of traction-engines, the object being to lead off the ropes from the drums in lines parallel to the axis of the engine-boiler without increasing the width of the engine or adding to its length. To this end we mount on either side of the boiler a winding-drum, setting the same vertically on stud-axles, and these drums we drive directly from the crank-shaft of the engine.

In Sheets IV and V the mode of carrying out this part of our invention is shown, Fig. 12 being a side elevation of a traction-engine fitted with a pair of side hauling-drums; Fig. 13, a partial end elevation of the same, and Fig. 14 a partial plan view of the same. In these figures, $A^3$ $A^3$ are the hauling-drums, mounted loosely on stud-axles made fast to the skin of the boiler. These drums are cast with a ring of spur-teeth, $A^4$ $A^4$, into which gear pinions $B^3$ $B^3$, which slide on feathers on the crank-shaft $B^6$, to permit of their being thrown in and out of gear with the drums. This crank-shaft is mounted above the barrel of the boiler, and keyed to it is a spur-wheel, $B^4$, by the side of which is a spur-wheel, $B^5$, capable of sliding on a feather on the crank-shaft. $C^4$ is a counter-shaft mounted parallel to the crank-shaft $B^6$ on the top of the boiler, and fitted with a fast spur-wheel, $C^5$, which gears into the sliding spur-wheel B⁵ when a slow motion is required to be imparted to the traction-wheels. C⁶ is a spur-wheel, which slides on a feather on the counter-shaft C⁴ and gears into the fixed wheel B⁴ when a quick motion is required. Keyed to one end of this counter-shaft is a spur-pinion, C⁷, which gears into a spur-wheel, D⁴, keyed to one end of a second counter-shaft, D⁵, which carries at its opposite end a spur-pinion, D⁶, for driving, through a spur-wheel, E⁶, the axle E⁷ of the traction-wheels E². This arrangement of driving-gear, it will be seen, permits of the hauling-drums being located close to the sides of the boiler, and thus no increase in the width of the engine is caused by the use of side drums, and the inconvenience of placing the drums in rear of the boiler is avoided. The ropes as they leave the drums may be led off by guide-pulleys, as indicated in the drawings, in any desired direction.

It should be remarked that when applying this part of our invention to what is known as "direct-acting tackle," where two engines are employed, one drum only will be required to be fitted to each engine.

Having now set forth the nature of our invention of improvements in machinery for tilling land by steam-power and explained the manner of carrying the same into effect, we wish it to be understood that what we claim is—

1. A traveling snatch-block for steam land-tillage, consisting of a frame having the triangular form and tines at its rear and the forked form at its forward end, and provided with a stud-pin for a guide-pulley, and carrying a cranked axle having traveling wheels adapted to be lifted off the ground to allow the tines to enter the ground.

2. The means, substantially as described, whereby the draft-rope when it has brought the cultivator to the end of its bout will be caused to act as a draft-rope on the anchor to move it along the headland, consisting of the combination of the frame and its disk-wheels D, rope E, pulley B, slotted lever F, elastic stop I, and clutch G′ on the axle.

3. In a steam tilling-machine, the combination, with the traveling anchor, the slotted lever, the rope, and the elastic stop, of a semaphore or equivalent signaling apparatus operated by the draft-rope, as and for the purpose described.

4. In a traction-engine, the combination, with the frame of winding-drums fitted upon opposite sides of the boiler, said drums being loosely mounted on stud-axles and provided with gear-wheels, as A⁴, of a crank-shaft, and pinions adapted to slide on said shaft, and means for throwing them into or out of connection with the gear-wheels of the drums.

PERCIVAL EVERITT.
THOMAS COOPER.

Witnesses to the signature of Percival Everitt:
G. I. REDFERN,
A. ALBUTT.

Witnesses to the signature of Thomas Cooper:
GEO. W. OLEWELL,
G. L. BRADFIELD.